Patented Feb. 23, 1932

1,846,639

UNITED STATES PATENT OFFICE

IVAN GUBELMANN, CLYDE O. HENKE, AND HENRY R. LEE, OF SOUTH MILWAUKEE, WISCONSIN, ASSIGNORS, BY MESNE ASSIGNMENTS, TO NEWPORT INDUSTRIES, INC., A CORPORATION OF DELAWARE

PROCESS OF PREPARING ABIETIC ACID

No Drawing.    Application filed July 2, 1928.   Serial No. 290,023.

This invention relates to a process of preparing abietic acid in a high state of purity from wood rosin.

It is an object of this invention to provide a method of preparing abietic acid in a high state of purity from low grade rosin obtained by extracting finely comminuted woods with suitable solvents and recovering the rosin from said extracts.

It is a further object to make available for various uses, the rosin acids which are present in wood rosin mixed with objectionable impurities, in the form of highly purified abietic acid.

Other and further important objects of this invention will become apparent from the following description and appended claims.

Wood rosin as produced by known methods has certain objectionable features when compared to gum rosin, among which are its great tendency to crystallize and its deep pigmentation. The present invention makes possible further uses of wood rosin hitherto not described in the literature to our knowledge.

In the heretofore known methods of preparing abietic acid, investigators have employed as a source of their raw material American colophony or gum rosin. Gum rosin has been recognized as a different product from wood rosin even to the extent that wood rosin must be identified as such on the packages whereas gum rosin is labeled "Rosin". The rosin acids are present in the two products in different proportions, as evidenced by such characteristics as the specific rotatory power and the different tendency to crystallize. The latter point is particularly important where the rosin is used in a solution form and gives gum rosin for this purpose a decided advantage. This difference in property is similarly observed even in the vacuum distilled products where the distilled wood rosin after chilling sets to a crystalline magma, the gum rosin sets glassy and practically transparent with, if any, only a few crystals present here and there. This invention takes advantage of the crystalline nature of the wood rosin as compared with the gum rosin in the preparation of the abietic acid. It is surprising to find that abietic acid could be prepared from wood rosin by a method employing similar steps as in the preparation of abietic acid from gum rosin with the accompanying advantages of better yields, fewer crystallizations and a more technically available raw material. Crude wood rosin contains about 83% and gum rosin 90-93% rosin acids calculated as abietic acid. These acids are quite likely present in different forms in the two types of rosin, for it has been recognized that the specific rotatory power of the acids contained therein are different. It further appears to us that on account of the greater tendency of the wood rosin to crystallize, that it contains a preponderance of a definite form, whereas the gum rosin may contain mixtures in a more nearly equal proportion. With this latter point in mind as a working basis, it has been borne out by experiment that fewer crystallizations are necessary to obtain a product of constant melting point and that larger yields of abietic acid are obtained.

This invention comprises a combination of a fractional distillation step under high vacuum and a crystallization step on such portions of the distillate which are high in abietic acid content. The fractional distillation of the rosin is for the purpose of substantially freeing the rosin of color bodies and increasing the abietic acid content of certain fractions sufficiently to enable the subsequent crystallization operation for the obtaining of pure abietic acid to be carried out effectively. Unless the abietic acid content of the rosin to be subjected to the crystallizing operation is 85% or over, preferably about 93%, the crystallization to obtain pure abietic acid cannot be carried out effectively. Consequently, crude wood rosin, which analyzes less than 85% rosin acids calculated as abietic acid, is not a satsifactory immediate starting material for the crystallization step. The distillation of the rosin effects the necessary degree of purification, so that a distillate is obtained practically free of pigments and of a relatively high abietic acid content, from which by simple methods of crystallizing from solvents a pure colorless abietic acid can be obtained. The rosin acids which are present in the mother liquor from the crystallization are recovered by evaporating off the solvent. The sticky mass thus obtained is then fractionally distilled giving a low boiling fraction and a high boiling fraction containing a high percentage of abietic acid. The high boiling fraction containing the abietic acid is crystallized from a solvent to give an additional amount of abietic acid. This step of recovering the rosin acids from the mother liquors of the abietic acid crystallization has not been previously described in connection with either the gum or wood rosin and is of necessity advantageous in a commercial process.

Without limiting our invention to any particular procedure, the following example in which parts by weight are given, will serve to illustrate our method in its preferred form.

Example

Wood rosin is distilled in high vacuum (2 m. m.), separating off fractionally the lower boiling fractions and reserving the light colored intermediate fraction for subsequent crystallization. The intermediate fraction contains about 93% abietic acid and after chilling is highly crystalline. To 12 parts of this intermediate fraction are added 30 parts of 80% (by weight) ethyl alcohol. The mass is heated until complete solution takes place and is then cooled to about 20° C. while agitating whereby crystals of abietic acid separate. The crystals are now removed by filtering and redissolved in 24 parts of 80% alcohol and the crystallization repeated as above. The product obtained after drying is practically white and has a melting point of about 165° C. Upon repeated crystallization from alcohol or other suitable solvents the melting point was not substantially raised.

The mother liquors resulting from the crystallization are evaporated to recover the alcohol, a sticky residue being left after evaporation. The abietic acid present in the residue is recovered by fractional distillation in vacuum, whereby a lower boiling fraction and a higher boiling fraction containing a high abietic acid content are obtained. The high boiling fraction may be used as a pale rosin or it may be crystallized from solvents as above to give a further amount of abietic acid. It is important that only such portions of distillate which are high in abietic acid content be used for crystallizing abietic acid as the recovery of crystals drops off out of proportion to the amount of impurity present therein.

The crystallization of the abietic acid may be performed in such a manner that the mother liquor from the second crystallization is used directly to crystallize the distillate high in abietic acid to obtain a crop of crude crystals. Other cycle arrangements to effect economy of solvent recovery and high yield of abietic acid have been made and are a part of this invention.

We have similarly employed other solvents than described above; as for example, other concentrations of ethyl alcohol, or wood alcohol, acetone or acetic acid.

We are aware of the fact that a process employing somewhat similar steps using gum rosin as the starting material has been described. Our invention resides chiefly in the improvements: first, which enable us to employ as starting material, wood rosin, a more economically practical raw material and one in which the abietic acid appears to be present in a form more highly adapted for the purposes set forth; and secondly, in the step of fractionally distilling the mother liquor residues to produce some low boiling fraction and a main fraction of high grade wood rosin which may be used as such or to crystallize further amounts of abietic acid.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing abietic acid from wood rosin, which comprises fractionally distilling a wood rosin under vacuum, dissolving an intermediate fraction high in abietic acid content in a solvent for abietic acid, crystallizing abietic acid out of the solution so formed, concentrating the mother liquor and fractionally distilling the mother liquor residues to recover abietic acid therefrom.

2. The process of preparing substantially pure abietic acid from wood rosin, which comprises fractionally distilling wood rosin under vacuum, dissolving a fraction of the distillate high in abietic acid content in a solvent for abietic acid and crystallizing abietic acid out of the solution.

3. The process of preparing substantially pure abietic acid from wood rosin, which comprises fractionally distilling wood rosin under vacuum, dissolving a fraction of the distillate high in abietic acid content in ethyl alcohol and crystallizing abietic acid out of the solution.

4. The process of preparing abietic acid from wood rosin, which comprises fractionally distilling wood rosin under vacuum, dissolving a fraction of the distillate high in abietic acid content in 80% ethyl alcohol and crystallizing abietic acid out of the solution.

5. The process of preparing substantially pure abietic acid from wood rosin, which comprises fractionally distilling wood rosin under vacuum, dissolving a fraction of the distillate containing about 93% abietic acid in a solvent for abietic acid and crystallizing abietic acid out of the solution.

6. The process of preparing abietic acid from wood rosin, which comprises fractionally distilling wood rosin under vacuum, dissolving a fraction of the distillate high in abietic acid content in a solvent for abietic acid and crystallizing abietic acid out of the solution, evaporating the mother liquors and fractionally distilling the mother liquor residue in vacuo to recover a high boiling fraction having a high abietic acid content.

7. In the process of producing abietic acid from rosins, the steps of forming a solution of a rosin distillate fraction high in abietic acid content, crystallizing abietic acid from said solution, evaporating the mother liquors and fractionally distilling the mother liquor residue in vacuo to recover a high boiling fraction having a high abietic acid content.

8. In the process of preparing abietic acid by crystallizing and separating the same from a solution of vacuum distilled wood rosin in an organic solvent, the step which comprises the recovery of a low melting rosin from the mother liquor residues produced in the process by evaporation of the solvent.

9. A process of preparing substantially pure abietic acid which comprises fractionally vacuum distilling wood rosin and crystallizing the distillate high in abietic acid content from an organic solvent.

10. A process of producing substantially pure abietic acid which comprises fractionally vacuum distilling wood rosin under an absolute pressure of about two millimeters of mercury and crystallizing the distillate high in abietic acid content from an organic solvent.

In testimony whereof we have hereunto subscribed our names at Carrollville, Milwaukee County, Wis.

IVAN GUBELMANN.
CLYDE O. HENKE.
HENRY R. LEE.